United States Patent

Inukai et al.

[11] Patent Number: 6,100,914
[45] Date of Patent: *Aug. 8, 2000

[54] IMAGE FORMING APPARATUS CAPABLE OF BEING USED AS FACSIMILE OR PRINTER

[75] Inventors: Tsuneyasu Inukai; Naoyuki Kikuchi, both of Gifu, Japan

[73] Assignee: Sanyo Electric Co., Ltd, Osaka, Japan

[ * ] Notice: This patent is subject to a terminal disclaimer.

[21] Appl. No.: 08/414,653

[22] Filed: Mar. 31, 1995

Related U.S. Application Data

[63] Continuation-in-part of application No. 08/292,696, Aug. 19, 1994.

[30] Foreign Application Priority Data

Mar. 31, 1994 [JP] Japan .................................. 6-062400

[51] Int. Cl.⁷ .............................. B41J 2/47; B41J 15/00; H04N 1/40
[52] U.S. Cl. .......................... 347/240; 358/298; 395/109
[58] Field of Search ................................... 347/237, 240, 347/131, 132; 358/296, 298, 300, 459; 395/109, 102

[56] References Cited

U.S. PATENT DOCUMENTS

| | | | |
|---|---|---|---|
| 4,602,262 | 7/1986 | Milligan et al. | 347/130 |
| 4,835,551 | 5/1989 | Ng | 358/296 X |
| 4,855,760 | 8/1989 | Kanayama | 347/240 |
| 5,038,158 | 8/1991 | Ayers et al. | 358/300 X |
| 5,072,303 | 12/1991 | Silverberg | 358/296 |
| 5,138,339 | 8/1992 | Curry et al. | 347/240 |
| 5,478,156 | 12/1995 | Kikuchi et al. | 358/298 X |
| 5,539,525 | 7/1996 | Tanuma et al. | 358/298 |
| 5,552,894 | 9/1996 | Aiba | 358/298 |

*Primary Examiner*—David F. Yockey
*Attorney, Agent, or Firm*—Darby & Darby

[57] ABSTRACT

An image forming apparatus includes a photosensitive drum which is exposed by a line head. The line head includes a fluorescent head having a plurality of individually driveable light points which are aligned in a plurality of sublines in the direction of the width of the photosensitive drum. Respective light points of the fluorescent head are driven by a line driver in accordance with drive data from a shift register which holds the drive data for all the light points. One print line is formed by a set of four sublines. In the case where the thinning of a line width is to be corrected, the print line is formed by sublines generated according to a fattening amount, whereby the line width is fattened. When the apparatus is used as a facsimile or a printer, a fattening amount for a facsimile or a fattening amount for printer is set.

16 Claims, 10 Drawing Sheets

F I G. 10
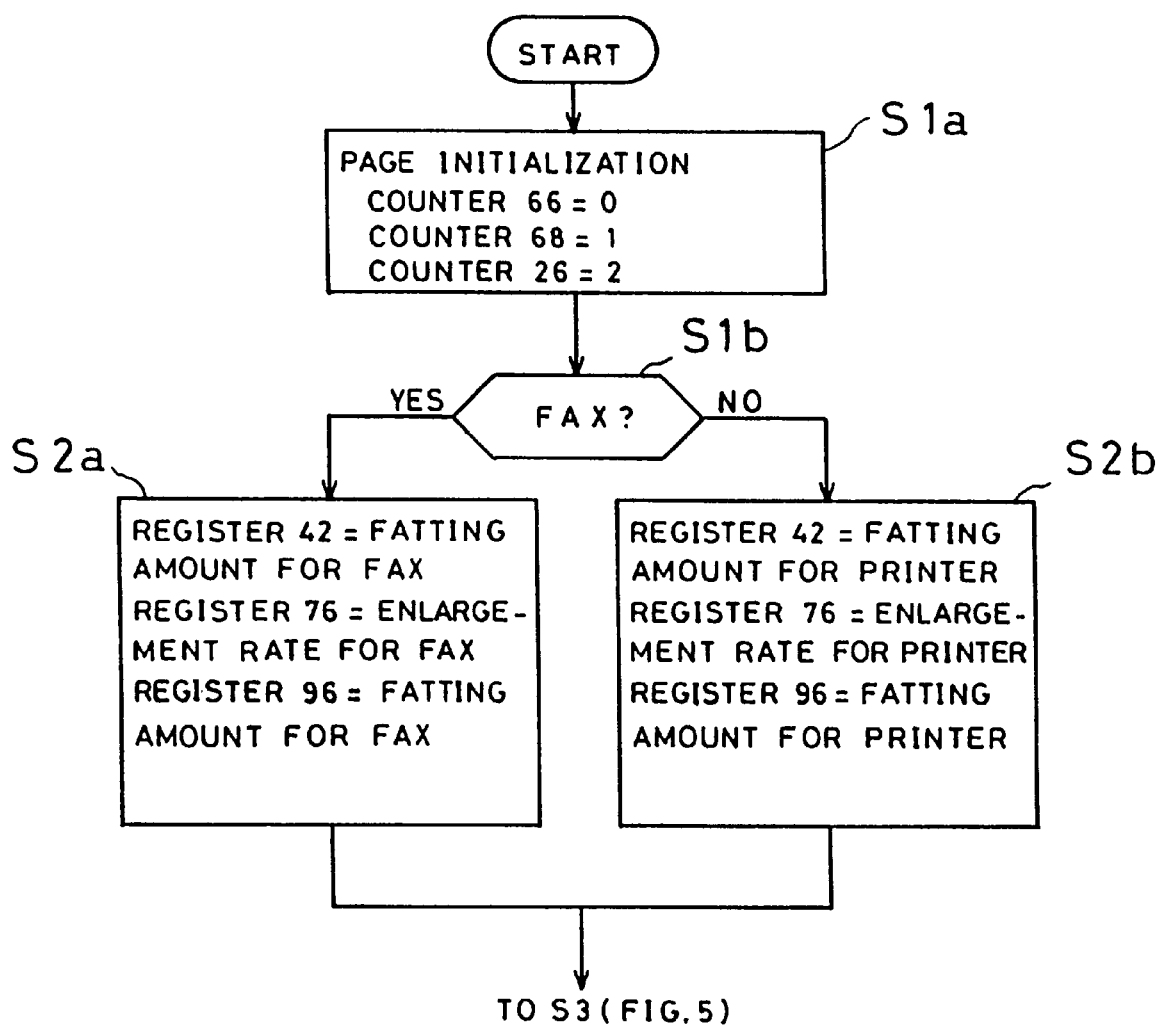

IMAGE FORMING APPARATUS CAPABLE OF BEING USED AS FACSIMILE OR PRINTER

This is a Continuation-In-Part application Ser. No. 08/292,696 filed on Aug. 19, 1994.

BACKGROUND OF THE INVENTION

1. Field of the Invention

The present invention generally relates to an image forming apparatus with a line head. More specifically, the present invention relates to a so-called complex image forming apparatus which can be used as a facsimile or a printer, in which a photosensitive member is exposed by a line head having a large number of light points aligned in a direction of a print line.

2. Description of the Prior Art

In a conventional laser beam printer, an electrophotographing system in which a laser scanner unit is utilized for an exposing means for exposing a photosensitive member. In such a laser beam printer, a laser beam is scanned on a surface of a photosensitive drum in a direction parallel to a rotation axis of the photosensitive drum (a main scanning direction) while the photosensitive drum is rotated in an auxiliary scanning direction, whereby an electrostatic latent image is formed on the photosensitive drum.

On the other hand, according to the recent advancement of a semiconductor technology, an LED head, a fluorescent head, a liquid crystal head, and forming a line head having a large number of light points aligned over the entire width of the photosensitive drum as seen developed, and a page printer which as utilizes such as a line head as the exposing means has been put into practical use. Such a page printer can be made with a low cost and can be miniaturized in comparison with the above described laser beam printer.

However in the page printer, because light from an adjacent line head light point adjacent to a pixel or dot not to be exposed, an image is blurred in the auxiliary scanning direction due to the irregularity of the rotation of the photosensitive drum, and a dot becomes to be thinned or fatted. In general, in an inverted developing system, i.e., a system in which a background portion is exposed and an image portion is not exposed, the dot or pixel is thinned, and in a non-inverted developing system, i.e., a system in which the image portion is exposed and the background portion is not exposed, the dot or pixel is fattened. Therefore, in the conventional page printer, due to the thinning or fattened of the dot or pixel, along a line width, image quality or print quality is low.

SUMMARY OF THE INVENTION

Therefore, a principal object of the present invention is to provide a novel image forming apparatus.

Another object of the present invention is to provide a printer with a line head, in which an image quality or print quality can be increased by correcting the thinning or fattening of the dot or pixel.

Another object of the present invention is to provide a printer with line head, in which the image quality or print quality can be increased by suppressing the moire.

Another object of the present invention is to provide an image forming apparatus which can be preferably used as a facsimile or a printer.

An image forming apparatus according to the present invention comprises: store means for storing input video data; a line head having a large number of light points aligned over the length of one print line for forming a print image according to the input video data by selectively driving the light points; first subline data generating means for generating a plurality of first subline data for a plurality of sublines constituting a print line on the basis of the input video data; supplying means for sequentially supplying the first subline data to the line head; designating means for outputting a correction signal when a line width correction is required; and replacing means for replacing the first subline data with second subline data for line width correction in response to the correction signal.

Since the first subline data is generated on the basis of the input video data, when no line width correction is designated, the first subline data are sequentially supplied to the line head by the supplying means. When the line width correction is designated, the correction signal is outputted from the designating means, and therefore, the second subline data is supplied to the line head from the supplying means instead of the first subline data. Therefore, the line width correction can be performed.

In accordance with the present invention, in an image forming apparatus, the line width correction can be performed, and accordingly, it is possible to increase the image quality or print quality.

In a preferred embodiment, an image forming apparatus is provided with second subline data generating means for generating the second subline data. Furthermore, the line width correction is performed in at least one of the main scanning direction and the auxiliary scanning direction. In a case of the line width correction in the main scanning direction, the second subline data generating means generates the second subline data on the basis of the image data of an adjacent dot or pixel of a current line. In a case of the line width correction in the auxiliary scanning direction, the second subline data is generated on the basis of the video data of a preceding line.

In an aspect of the present invention, the first subline data generating means generates the first subline data by sampling the input video data. Therefore, by suitably setting the sampling timing or sampling position, it is possible to print the input video with being enlarged or reduced, or it is possible to convert the resolution of the input video to be adapted to the resolution of the line head. By making the sampling positions of the plurality of sublines different from each other, the moire can be reduced.

In addition, correction data such as fattening amount and, enlargement rate data are selectively set according to whether the image forming apparatus is used as a facsimile or a printer. Therefore, in a case of a facsimile, a thin line is not, made to disappear and no moire occurs, and in a case of a printer, no thinning or fatting occurs.

The above described objects and other objects, features, aspects and advantages of the present invention will become more apparent from the following detailed description of the present invention when taken in conjunction with the accompanying drawings.

BRIEF DESCRIPTION OF THE DRAWINGS

FIG. 10 is a flow chart showing a portion of an operation of the embodiment, in which an image forming apparatus is used as a facsimile or a printer.

DETAILED DESCRIPTION OF THE PREFERRED EMBODIMENTS

Figure 1:
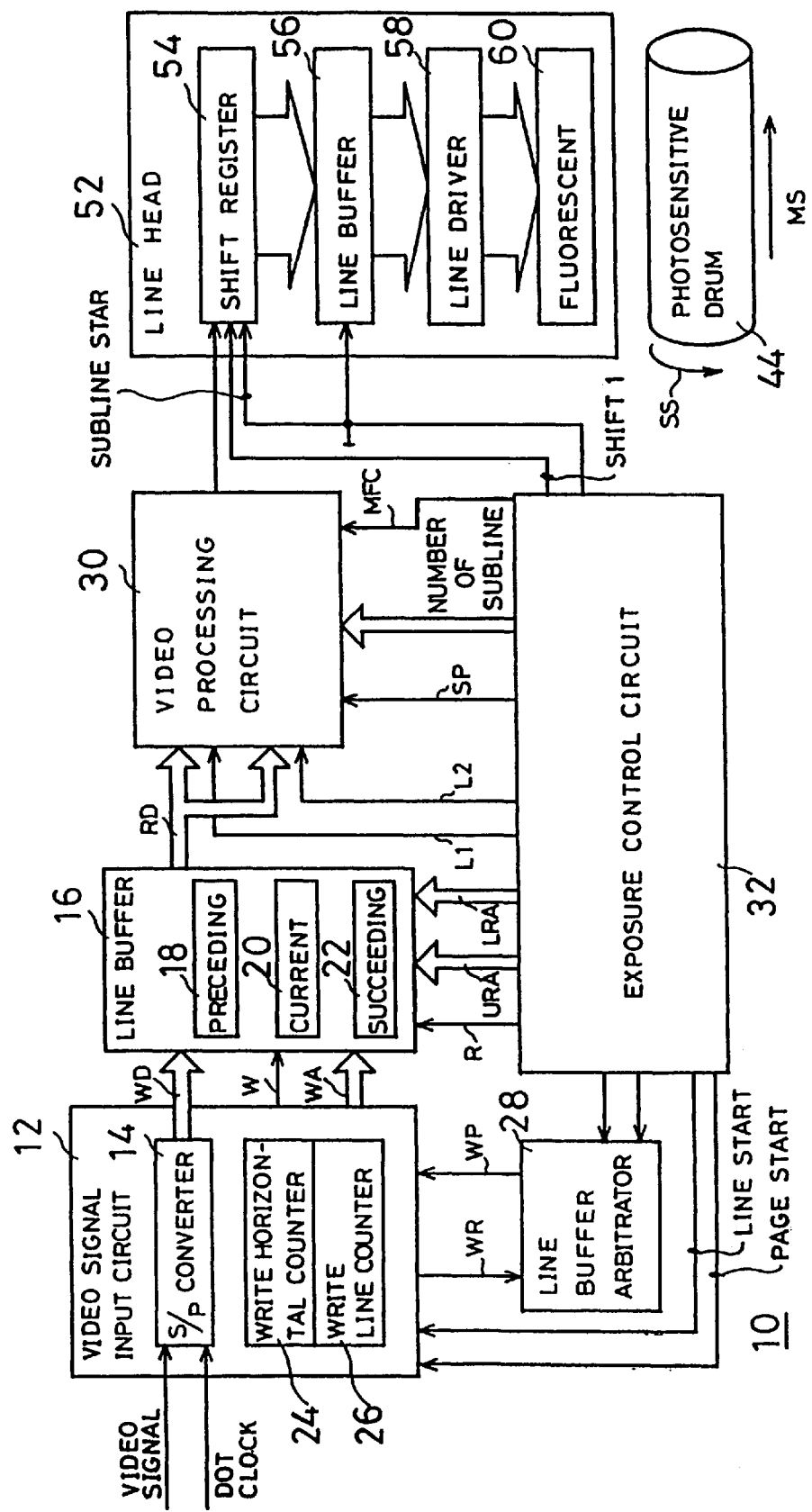
FIG. 1 is a block diagram showing one embodiment according to the present invention.

Referring to FIG. 1, an image forming apparatus 10 of this embodiment shown includes a video signal input circuit 12. The video signal input circuit 12 includes an S/P (serial/parallel) converter 14 to which a video signal according to a video map system and a dot clock from a controller portion (not shown) included in the image forming apparatus 10 is applied. The S/P converter 14 samples the video signal at a timing of the dot clock, and outputs the same as bit-parallel write data WD. The write data WD is 8-bit parallel data, for example. The write data WD is applied to a line buffer 16. The line buffer 16 includes a preceding line buffer 18, a current line buffer 20 and a succeeding line buffer 22, and is found by utilizing an SRAM, for example, However, the line buffer 16 may be constructed by another kind of memory. The current line buffer 20 is for storing the video data being printed, the preceding line buffer 18 holds the video data of a line just before the current line, and the succeeding line buffer 22 holds the video data of a line just after the current line.

The video signal input circuit 12 includes two counters 24 and 26 for designating an address of the line buffer 16. A write horizontal counter 24 is a counter of 10 bits, for example, and generates an address representing lack dot or pixel of 4000 dots or pixel, for example, constituting one line. A write line counter 26 outputs an address for designating the succeeding buffer 22 with data of 2 bits, for example. The addresses from the write horizontal counter 24 and the write line counter 26 are applied to the line buffer 16 as a write address WA of 12 bits, for example. Accordingly, in the line buffer 16, the write data WD sent from the S/P converter 14 is written in the succeeding line buffer 22 in accordance with the write address WA. In writing the write data WD, in order to avoid the conflict with the reading operation by a video processing circuit 30, the video signal input circuit 12 outputs a write request signal WR to a line buffer arbitrator 28, and after receiving a write permission signal WP from the line buffer arbitrator 28, outputs a write signal W as "1", and therefore, the write data WD is written in the line buffer 16.

When reading the line buffer 16 by the video processing circuit 30, a read signal R, and an upper read address URA, and a lower read address LRA are applied from an exposure control circuit 32. The upper read address URA and the lower read address LRA are respectively 2 bits and 10 bits, and therefore, a read address of 12 bits in total is applied to the line buffer 16.

Figure 2:
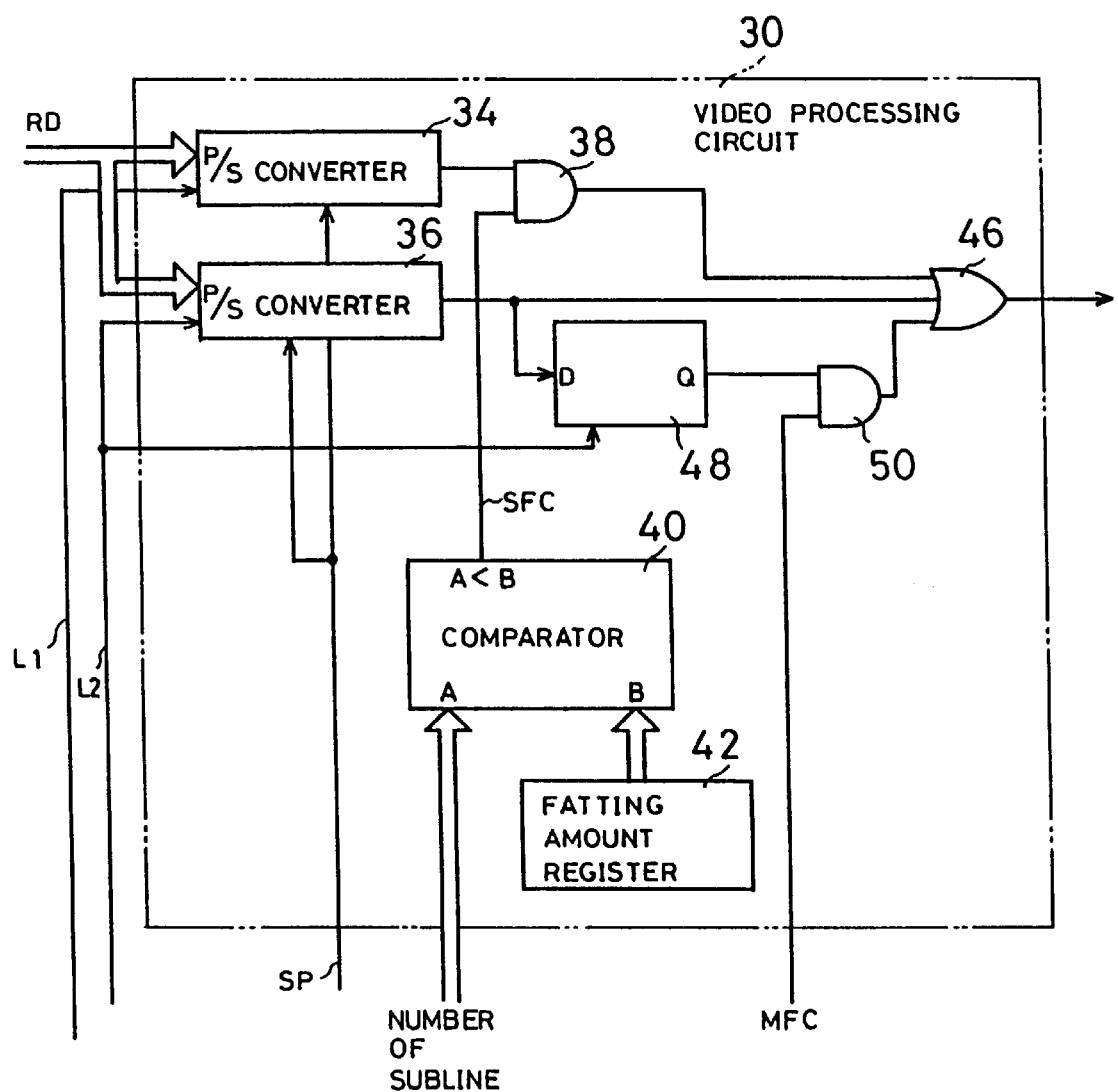
FIG. 2 is a block diagram showing a video processing circuit of the FIG. 1 embodiment in detail.

As shown in FIG. 2 in detail, the video processing circuit 30 includes P/S converters 34 and 36 which receive read data RD from the line buffer 16. Each of the P/S converters 34 and 36 converts the read data RD of 8-bit parallel data into bit-serial data and outputs the same. A preceding line load signal L1 from the exposure control circuit 32 (FIG. 1) is applied to the P/S converter 34, and a current line load signal L2 from the exposure control circuit 32 is applied to the P/S converter 36. Therefore, the P/S converter 34 is loaded with the read data from the preceding line buffer 18 of the line buffer 16, and the P/S converter 36 is loaded with the read data from the current line buffer 20 of the line buffer 16. Then, an S/P shift signal SP from the exposure control circuit 32 is applied to the P/S converters 34 and 36. In response to the signal SP, the P/S converters 34 and 36 output 8-bit data, respectively, in a bit serial fashion.

The bit-serial data from the P/S converter 34 is applied to one input of an AND gate 38. To the other input of the AND gate 38, a signal SFC from a comparator 40 is applied.

The comparator 40 receives as one input A subline number data which is applied from the exposure control circuit 32 and as the other input B fatting amount data from a fatting amount register 42. The fatting amount register 42 is a register of 2 bits, for example, and therefore, any one of the number "0"–"3" is set in the fatting amount register 42 as the fatting amount data in the following manner. On the assumption that an amount representative of a fatting amount in the auxiliary scanning direction becomes how many dots or pixel of the line head is a fatting rate XS in the auxiliary scanning direction. The fatting rate Xs is smaller than "1". Then, in the fatting amount register 42, data of "Xs×4" is set. However, in practice, as such the fatting amount data, an optimum value is set while the print image is viewed. Then, the comparator 40 compares the subline number data applied to the input A and the fatting amount data applied to the input B with each other, and when the former is smaller than the latter (A<B), outputs the signal SFC of "1". That is, the comparator 40 applies the fatting correction signal SFC to the AND gate 38 when the fatting correction in the auxiliary scanning direction is required. For example, when "2" is set as the fatting amount data, the fatting correction signal SFC of "1" is outputted from the comparator 40 at a timing of each of the first and second sublines. In addition, the fatting correction controlled by the comparator 40 is a correction for fatting a dot or pixel which is thinned in the auxiliary scanning direction of a photosensitive drum 44 (FIG. 1), i.e., in a direction shown by an arrow mark SS in FIG. 1. Therefore, subline data for performing the fatting correction in the auxiliary scanning direction SS of the photosensitive drum 44 is outputted from the AND gate 38. An output of the AND gate 38 is applied to an OR gate 46.

Furthermore, an output of the P/S converter 36 is delayed by 1 bit by a D flip-flop 48, and then, applied to one input of an AND gate 50. To the other input of the AND gate 50, a fatting correction signal MFC from the exposure control circuit 32 (described in detail later) is applied. The signal MFC is a signal which becomes "1" at a time that the fatting correction in the main scanning direction of the photosensitive drum 44 shown by an arrow mark MS in FIG. 1 is required. Therefore, subline data for performing the fatting correction in the main scanning direction MS of the photosensitive drum 44 is outputted from the AND gate 50. An output of the AND gate 50 is applied to the OR gate 46. The OR gate 46 further receives an output of the P/S converter 36.

Therefore, the subline data of the current line, the subline data for performing the fatting correction in the auxiliary scanning direction, or the subline data for performing the fatting correction in the main scanning direction is outputted from the OR gate 46. More specifically, when the fatting correction signal SFC is "1", the subline data of the preceding line for performing the fatting correction in the auxiliary scanning direction is outputted from the OR gate 46. When the fatting correction signal MFC is "1", the subline data for performing the fatting correction in the main scanning direction is outputted from the OR gate 46. When the both of the fatting correction signals SFC and MFC are "0", only the subline data of the current line from the P/S converter 36 is outputted from the OR gate 46, and therefore, no fatting correction is performed.

Turning back to FIG. 1, a line head 52 which receives data from the OR gate 46 (FIG. 2) of the video processing circuit 30 includes a shift register 54 of 4000 bits, for example, that corresponds to 4000 dots or pixel, for example, of a line aligned over the width of the photosensitive drum 44. The shift register 54 performs a shift operation to store the subline data applied from the video processing circuit 30 at every timing that a shift signal SHIFT1 outputted from the exposure control circuit 32 is applied thereto. At every timing that the subline data of 4000 bits, for example, is received, the shift register 54 loads the subline data of 4000 bits, for example, in a bit-parallel fashion to a line buffer 56 in response to a signal SUBLINE START outputted from the exposure control circuit. An output of the line buffer 56 is applied to a line driver 58. Therefore, the line driver 58 drives or does not drive respective light points of a fluorescent head 60, i.e., respective dots or pixels in accordance with a state of the data for each of the dots of the subline data. Therefore, the photosensitive drum 44 is light-exposed by the fluorescent head 60.

Figure 3:
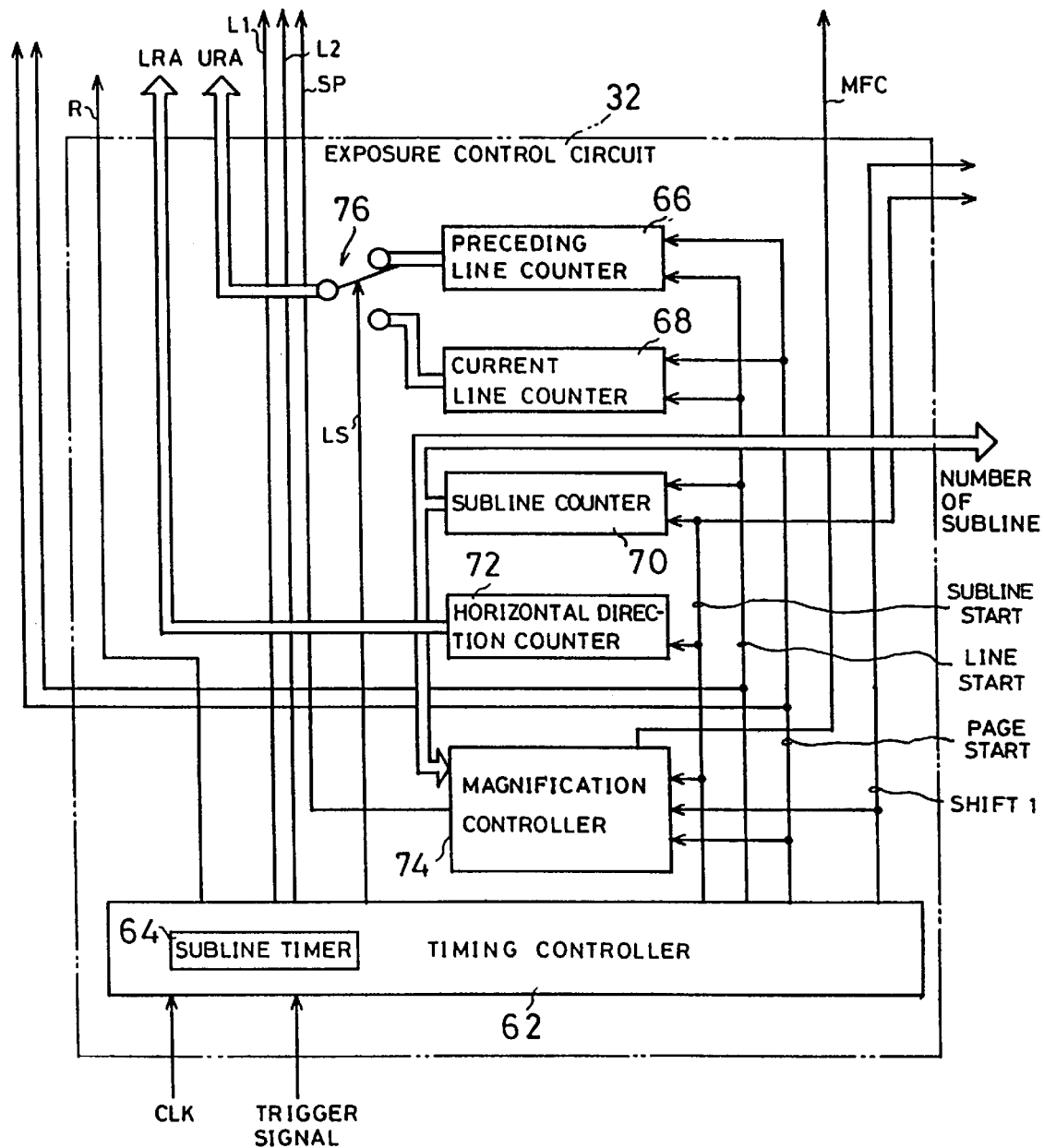
FIG. 3 is a block diagram showing an exposure control circuit of the FIG. 1 embodiment in detail.

With reference FIG. 3, the exposure control circuit 32 shown in FIG. 1 includes a timing controller 62 which includes a subline timer 64. The timing controller 62 is triggered by a trigger signal which is applied from a computer (not shown), for example, and in response to the trigger signal, starts an operation thereof. Then, the subline timer 64 counts a clock signal CLK so as to count one subline time period. From the timing controller 62, a signal PAGE START indicating a page start, a signal LINE START indicating a line start, and a signal SUBLINE START indicating a subline start are outputted. More specifically, after the subline start signal SUBLINE START is outputted, at a timing that the subline timer 64 counts one subline time period, the signal SUBLINE START is outputted again. At a time that the subline start signal SUBLINE START is outputted four times, the line start signal LINE START is outputted. That is, each print line is constituted by four sublines. However, the number of sublines constituting each print line is not limited to four. In addition, the page start signal PAGE START designates the start of each page. The page start signal PAGE START and the line start signal LINE START are applied to the above described video signal input circuit 12 shown in FIG. 1, and to a preceding line counter 64 and a current line counter 68, respectively. The subline start signal SUBLINE START is applied to a subline counter 70 and a horizontal direction counter 72. Furthermore, the page start signal PAGE START and the subline start signal SUBLINE START are applied to a magnification controller 74 shown in detain in FIG. 4.

The preceding line counter 64 is a counter for holding the lower read address LRA for designating the preceding line buffer 18 of the line buffer 16, and the same is reset by the page start signal PAGE START, and incremented by the line start signal LINE START. The current line counter 68 is a counter for holding the upper read address URA for designating the current line buffer 20 in the line buffer 16, and the same is reset by the page start signal PAGE START, and incremented by the line start signal LINE START. The subline counter 70 is a counter for holding the subline number data, and the same is reset by the line start signal LINE START, and incremented by the subline start signal SUBLINE START. Then, a count value of the subline counter 70, i.e., the subline number data is applied to the input A of the comparator 40 included in the video processing circuit 30 as described above. Furthermore, the subline number data is also applied to the magnification controller 74.

The horizontal direction counter 72 is a counter for counting 4000 dots, for example, constituting one print line is similar to the write horizontal direction counter 24 (FIG. 1), and the same is reset by the subline start signal SUBLINE START, and incremented by the clock signal CLK. A count value of the horizontal direction counter 72 is applied to the line buffer 16 as the lower read address LRA. As the upper read address URA, a count value of the preceding line counter 66 or a count value of the current counter 68 which is selectively outputted from a selector 76. To the selector 76, a line select signal LS is applied from the timing controller 62. That is, the timing controller 62 outputs the signal LS of "1", for example, when the preceding line data is to be read, and the signal LS of "0", for example, when the current line data is to be read. In response thereto, the selector 76 selects and outputs the count value of the preceding counter 66 according to the signal LS of "1", or selects and outputs the count value of the current line counter 68 according to the signal LS of "0". In addition, the timing controller 62 applies the read signal R of "0" to the line buffer 16 when the line buffer 16 is to be read.

Furthermore, the shift signal SHIFT1 outputted from the timing controller 62 is a signal for loading the 8-bit video data to the shift register 54 (FIG. 1), and applied to the shift register 54 as described above, and to the magnification controller 74. As described above, the preceding line load signal L1 and the current line load signal L2 are outputted from the timing controller 62, and the same are individually applied to the P/S converters 34 and 36 of the video processing circuit 30. The S/P shift signal SP which is applied to the P/S converters 34 and 36 is outputted from the magnification controller 74.

Figure 4:
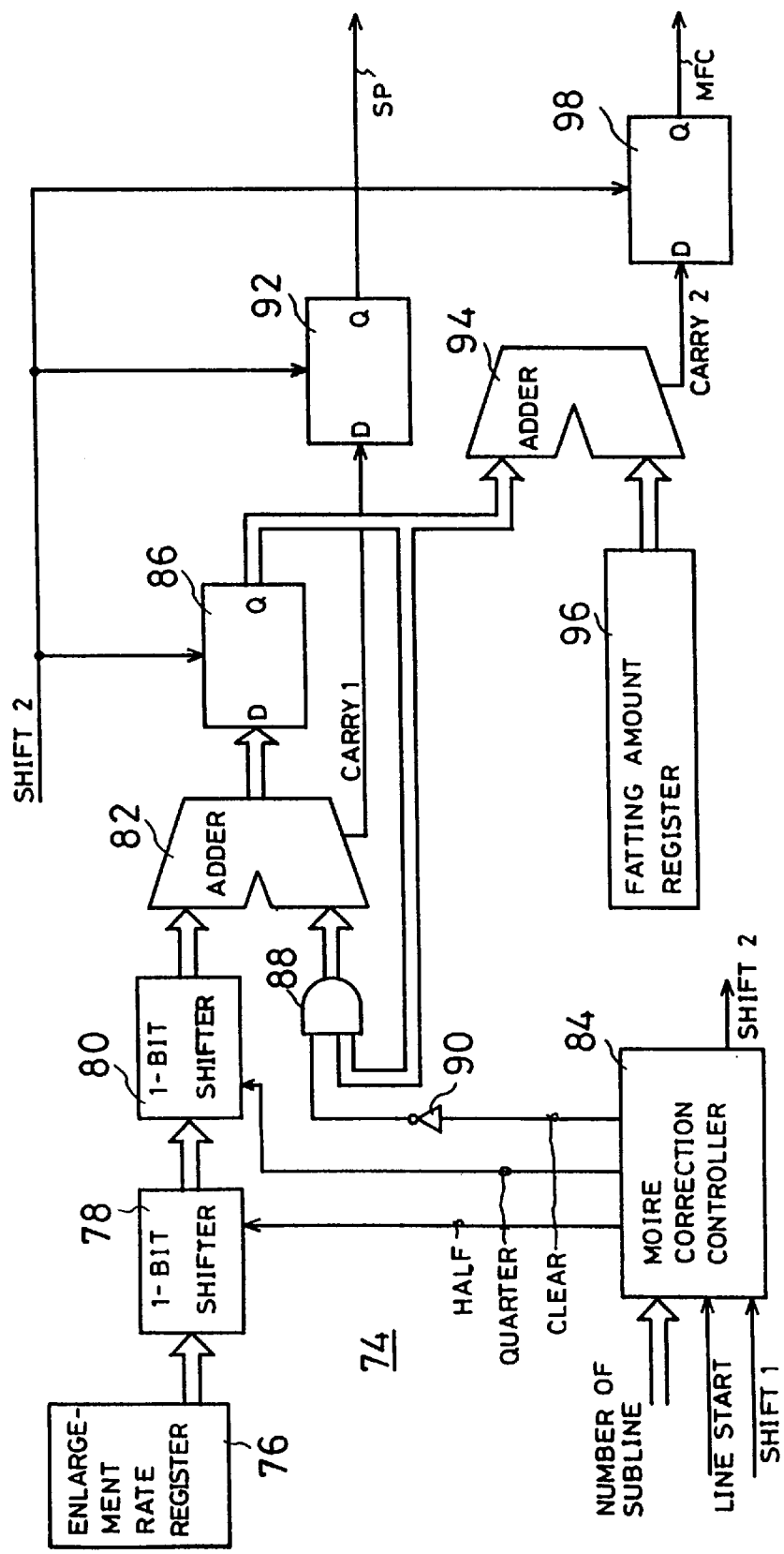
FIG. 4 is a block diagram showing a magnification control circuit of the FIG. 3 embodiment in detail.

The magnification controller 74 shown in detail in FIG. 4 includes an enlargement rate register 76 to which enlargement rate data is loaded from the computer (not shown), for example. The enlargement rate to be loaded to the enlargement rate register 76 produced as follows. In converting an image of 200 dpi, for example, into an image of 300 dpi, for example, if the enlargement rate is "1", the image is printed with the resolution of 300 dpi and is reduced to 66%. Therefore, if it is required to print an image of 300 dpi with the same magnification, it is necessary to enlarge respective dots with an enlargement rate by which the above described reduction rate is compensated. Then, in such a case, the enlargement rate data is loaded to the enlargement rate register 76 from the computer (not shown). If the image of 200 dpi is to be printed 300 dpi with the same magnification, the enlargement rate of "1.5" ($\neq 1/0.66$) is to be set.

More specifically, the enlargement rate register 76 is an 8-bit register, and the enlargement rate data is set to the enlargement rate register 76 in accordance with the following equation. In addition, an enlargement rate by which a calculated result according to the following equation becomes more than "256" is not set. setting value={(image resolution in main scanning direction×256)/(line head resolution in main scanning direction×enlargement rate)}−1

In addition, in a case of the same magnification, the enlargement rate is set as "1", and if the image is to be reduced by, the enlargement rate is set as "0.5", and if the image is to be enlarged double, the enlargement rate is set as "2". Furthermore, the enlargement rate data set into the enlargement rate register 76 is a value of any one of "0"–"256". For example, in assuming that a width of one dot of the input video signal of 200 dpi is "256", and the input video signal is printed by the line head 52 having the resolution of 300 dpi, the enlargement rate data indicates respective subline data is to be sampled at which position of the "256".

Then, enlargement rate data set in the register 76 is applied to one input of an adder 82 through two 1-bit shifters 78 and 80. Each of the 1-bit shifter 78 and 80 makes the input data half. Therefore, an output of the 1-bit shifter 78 is the enlargement rate data×½, and an output of the 1-bit shifter 80 is the enlargement rate data×¼. The 1-bit shifter 78 is enabled by a signal HALF from a moire correction controller 84, and the 1-bit shifter 80 is enabled by a signal QUARTER from the same moire correction controller 84.

The moire correction controller 84 receives the subline number data from the subline counter 70 (FIG. 3), and the line start signal LINE START and the shift signal SHIFT1 from the timing controller 62 (FIG. 3). Then, signals CLEAR and SHIFT2 are outputted from the moire correction controller 84 other than the signals HALF and QUARTER. Truth tables of the moire correction controller 84 are shown by the following tables 1, 2 and 3.

TABLE 1

| Initial Value | Number of Subline | HALF | QUARTER | CLEAR | SHIFT2 |
|---|---|---|---|---|---|
| Enlargement Rate × 1/4 | 0 | * | * | 1 | 1 |
| Enlargement Rate × 2/4 | 1 | * | * | 1 | 1 |
| Enlargement Rate × 3/4 | 2 | 1 | 1 | 1 | 1 |
| Enlargement Rate × 4/4 | 3 | * | * | 1 | 1 |

TABLE 2

| Initial Value | Number of Subline | HALF | QUARTER | CLEAR | SHIFT2 |
|---|---|---|---|---|---|
| Enlargement Rate × 1/4 | 0 | 1 | 1 | 1 | 1 |
| Enlargement Rate × 2/4 | 1 | 1 | 0 | 1 | 1 |
| Enlargement Rate × 3/4 | 2 | 1 | 0 | 0 | 1 |
| Enlargement Rate × 4/4 | 3 | 0 | 0 | 1 | 1 |

TABLE 3

| Initial Value | Number of Subline | HALF | QUARTER | CLEAR | SHIFT2 |
|---|---|---|---|---|---|
| Enlargement Rate × 1/4 | 0 | 0 | 0 | 0 | SHIFT1 |
| Enlargement Rate × 2/4 | 1 | 0 | 0 | 0 | SHIFT1 |
| Enlargement Rate × 3/4 | 2 | 0 | 0 | 0 | SHIFT1 |
| Enlargement Rate × 4/4 | 3 | 0 | 0 | 0 | SHIFT1 |

An output of the adder 82 is applied to one input of an AND gate 88 through a latch 86. To the other input of the AND gate 88, the signal CLEAR from the moire correction controller 84, which is inverted by an inverter 90 is applied. Then, an output of the AND gate 88 is applied to the other input of the adder 82. That is, the adder 82 makes an adding operation of the enlargement rate data (or ½, or ¼) applied from the 1-bit shifter 80 and an output of the adder 82. That is, the adder 82 makes an accumulative adding operation. Then, a carry signal CARRY1 from the adder 82 is latched by a latch 92, and the same is outputted as the above described S/P shift signal SP.

The output of the adder 82 being latched is also applied to one input of an adder 94. To the other input of the adder 94, fatting amount data from a fatting amount register 96 is applied. The fatting amount data is applied from the computer (not shown), for example, and the same is data for fatting correction of a dot in the main scanning direction MS of the photosensitive drum 44 (FIG. 1). The fatting amount register 96 is an 8-bit register, for example, and the fatting amount data within 1 dot is set in the following manner. More specifically, a thinned amount by the line head 52 normally does not exceed 1 dot of the line head 52. On the assumption that a fatting rate representing how many dots of the line head is to be fatted in the main scanning direction is Xm (Xm<1), "(the set value in the enlargement rate register 76+1)×Xm−1" is set in the fatting amount register 96; however, in fact, an optimum value for the fatting amount is set while the printed image is seen. For example, in a case where the set value of the enlargement rate register 76 is "127" and the fatting rate is "0.5", "63" that is a result of "(127+1)×0.5−1" is set as the 8-bit data. At the time of the fatting rate Xm of "0.5", the subline data of two sublines out of four sublines are replaced with the subline data for fatting correction. Then, a carry signal CARRY2 from the adder 94 is latched by a latch 98, and the same is outputted as the above described signal MFC.

Thus, the magnification controller 74 is a circuit for controlling the magnification in the horizontal direction (a direction of the print line), and the same is initialized in response to the subline start signal SUBLINE START from the timing controller 62 (FIG. 3), and then, receives the shift signal SHIFT1, and outputs the S/P shift signal SP by thinning the shift signal SHIFT1 in accordance with the enlargement rate set in the enlargement rate register 76. At this time, a position at which the shift signal is thinned is changed in accordance with a signal from the moire correction controller 84. That is, the moire correction controller 84 receives the subline number data and outputs the moire correction signal HALF, QUARTER or CLEAR such that a thinning position (sampling position) for performing the moire correction can be moved.

Figure 5A:
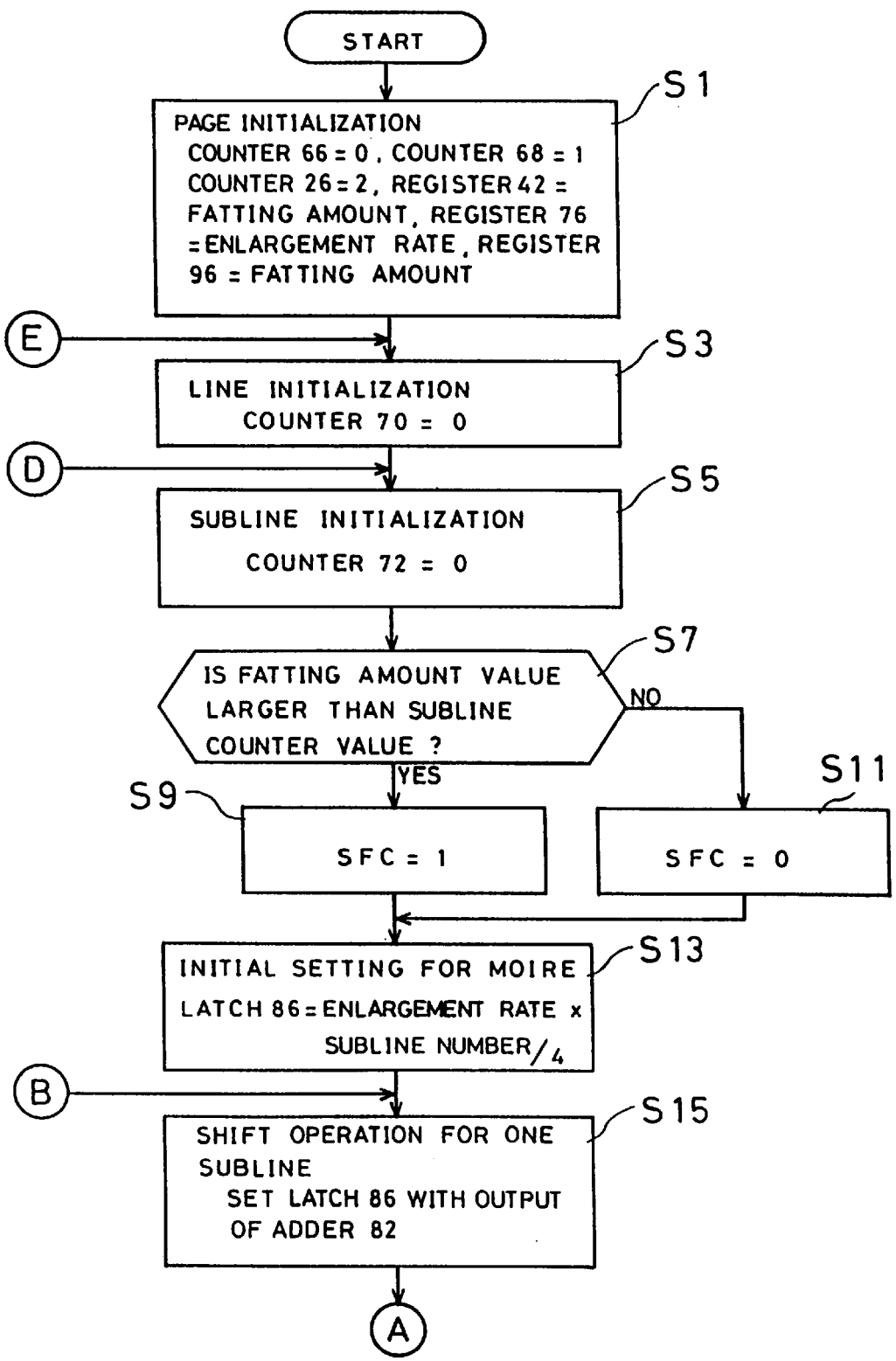
FIG. 5A, FIG. 5B and FIG. 5C are flowcharts showing an operation of the embodiment shown in FIG. 1–FIG. 4.
Figure 5B:
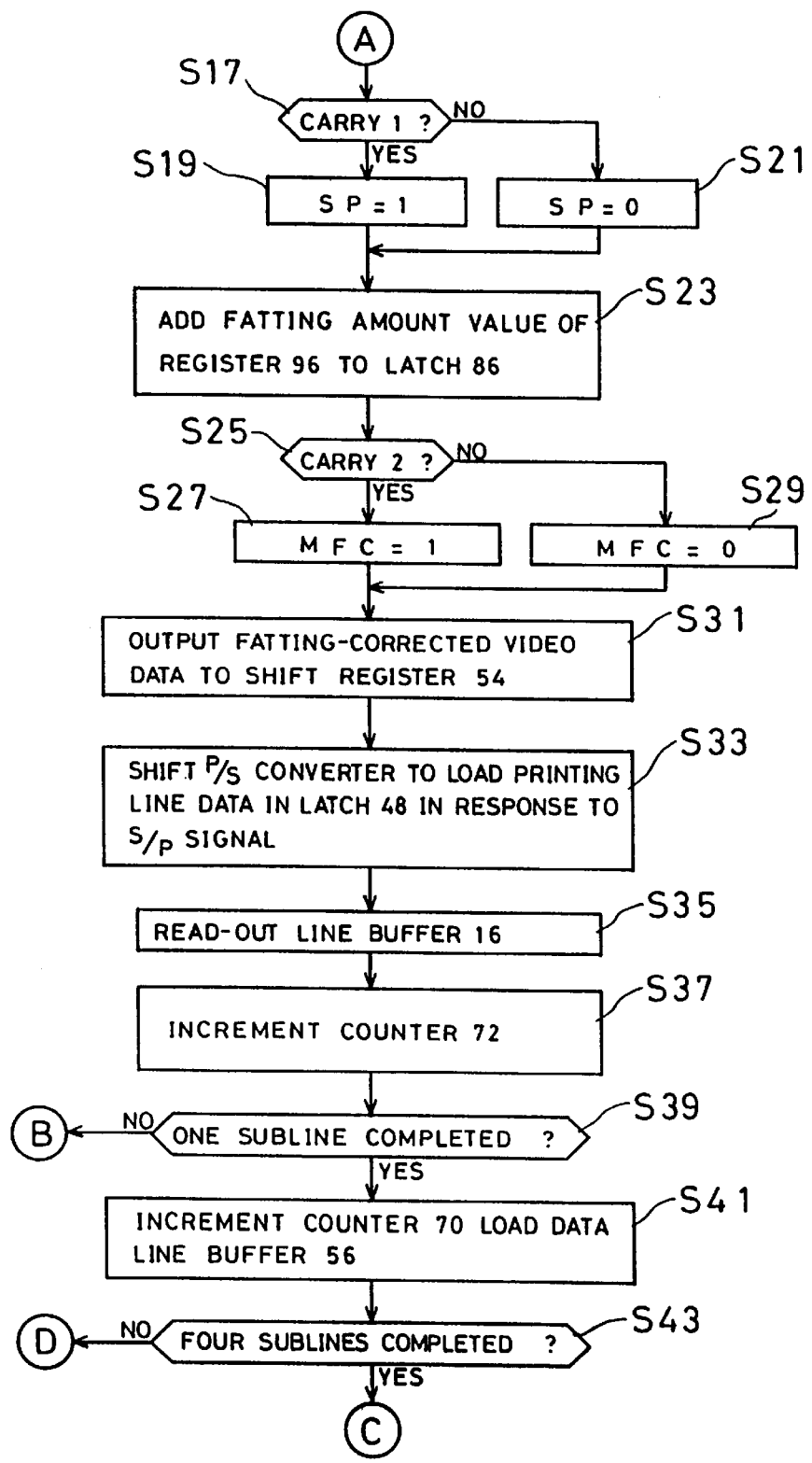
Figure 5C:
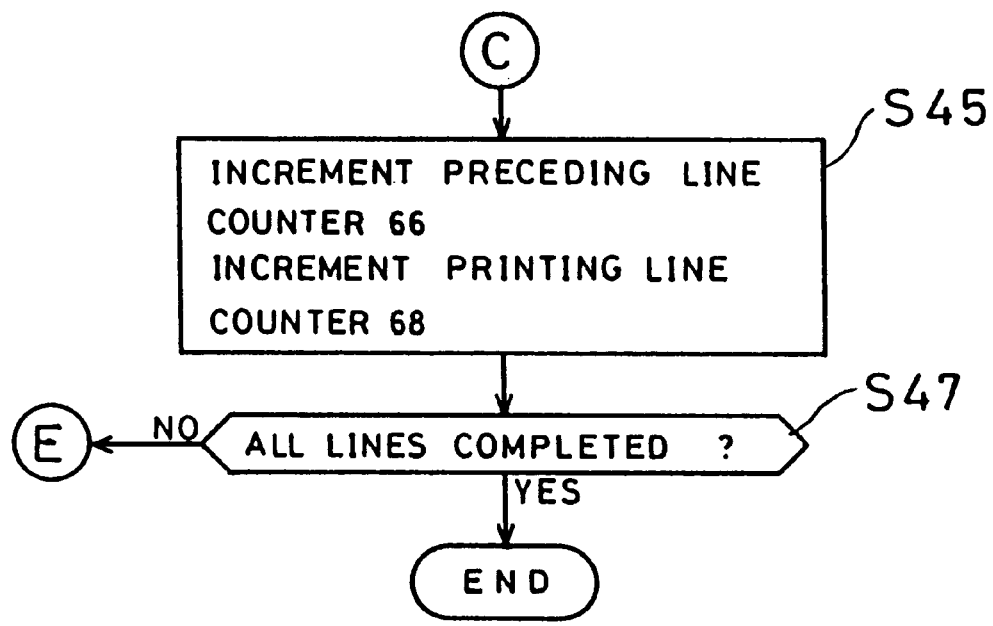

Next, referring to FIG. 5A–FIG. 5C, an operation of the embodiment shown in FIG. 1–FIG. 4 will be described in detail. In addition, the embodiment shown in FIG. 1–FIG. 4 is actually formed by a hardware component such as a gate array; however, if the operation of the embodiment can be represented by a flowchart, as shown in FIG. 5A–FIG. 5C. Therefore, it will be easily understood that instead of the circuit being formed by a hardware, a microcomputer which operates according to the flowcharts shown in FIG. 5A–FIG. 5C may be utilized.

In a first step S1 of FIG. 5A, the timing controller 62 (FIG. 3) is triggered by the computer (not shown), and in response thereto, the page start signal PAGE START, the line start signal LINE START and the subline start signal SUBLINE START are outputted from the timing controller 62. In response to the page start signal PAGE START, "0" is set in the preceding line counter 66, and "1" is set in the current line counter 68, and "2" is set in the write line counter 26. Furthermore, from the computer (not shown), the fatting amount data for the auxiliary scanning direction is set in the fatting amount register 42 (FIG. 2), and the enlargement rate data is set in the enlargement rate register 76 (FIG. 4), and the fatting amount data for the main scanning direction is set in the fatting amount register 96 (FIG. 4).

Next, in a step S3, in response to the line start signal LINE START, "0" is set in the subline counter 70. In addition, the subline counter 70 is an incremental counter. Then, in a next step S5, in response to the subline start signal SUBLINE START, "0" is set in the horizontal direction counter 72.

After the initialization thus performed, in a next step S7, the comparator 40 (FIG. 2) determines whether or not the fatting amount data set in the fatting amount register 42 is larger than the subline number outputted from the subline counter 70. If B>A, in a step S9, the fatting correction signal SFC in the auxiliary scanning direction is outputted as "1". However, if "NO" is determined in the step S7, the signal SFC is made as "0" in a step S11.

Thereafter, in a step S13, an initial setting for the moire correction is performed. More specifically, in the step S13. "magnification rate x subline number/4" is set in the latch 86 (FIG. 4). In a case where an initial value of "enlargement rate×¾" is set in the latch 86, for example, the respective signals HALF, QUARTER, CLEAR, and SHIFT2 are outputted from the moire correction controller 84 in accordance with the above described tables 1 and 2. In response to a clock signal just after the subline start signal SUBLINE START is outputted, all the signals are outputted as "1" as shown in the Table 1. Therefore, the enlargement rate set in the enlargement rate register 76 is made ½ by the 1-bit shifter 78. In addition, in this case, the most significant bit is outputted as "0". The output of the 1-bit shifter 78 is further made ½ by the 1-bit shift 80, and therefore, "enlargement rate×¼" is applied to the one input of the adder 82. On the other hand, since the signal CLEAR is also "1", the AND gate 80 is turned-off, and thus, the other input of the adder 82 is "0". Therefore, "enlargement rate×¼" is latched by the latch 86. In response to a next clock signal, according to the table 2, the signal HALF is outputted as "1", and the signals QUARTER and CLEAR are respectively outputted as "0", and the signal SHIFT2 is outputted as "1". Therefore, at a time of the next clock signal, the AND gate 88 is turned-on, and therefore, the data from the latch 86, i.e. "enlargement rate×¼" is applied to the other input of the adder 82. On the other hand, since the signal HALF of "1" is applied to the 1-bit shifter 78, at the output of the 1-bit shifter 78, "enlargement rate×½" is obtained. Since the signal QUARTER is "0", the 1-bit shifter 80 outputs the input data as it is. Therefore, to the other input of the adder 82, the output of the 1-bit shifter 78 is applied as it is. Accordingly, as the output of the adder 82, "enlargement rate×¼"+"enlargement rate×½" is obtained, and in response to the signal SHIFT2, the data is latched by the latch 86. Thus, the initial value for the moire correction is set in the latch 86.

In a next step S15, a shift operation for 1 subline is performed. More specifically, on the basis of the data of the latch 86 which is set in the step S13, an adding operation of the data of the latch 86 and the enlargement rate data from the enlargement rate register 76 is performed. At this time, all the signals HALF, QUARTER and CLEAR are "0" as shown in the table 3, and therefore, the signal SHIFT1 is outputted as it is as the signal SHIFT2, and accordingly, the data of the latch 86 and the enlargement rate data are added to each other at every timing of the signal SHIFT1, and the same is latched again in the latch 86.

Then, in a step S17, it is determined whether or not the carry signal CARRY1 is outputted from the adder 82. If the carry signal CARRY1 is obtained, the latch 92 latches the signal in response to the signal SHIFT1 (SHIFT2), and outputs the S/P shift signal SP as "1". If "NO" is determined in the step S17, the signal SP is made as "0" in a step S21.

Thereafter, in a step S23, an adding operation of the data of the latch 86 and the fatting amount data set in the fatting amount register 96 is performed by the adder 94. Then, in a next step S25, it is determined whether or not the carry signal CARRY2 is outputted from the adder 94. If "YES" is the result in the step S25, in a step S27, the fatting correction signal MFC in the main scanning direction is made as "1", and if "NO" in the step S25, in a step S29, the signal MFC is made as "0". More specifically, the fact that the carry signal CARRY2 is obtained from the adder 94 means that a sampling position indicated by the latch 86 is spread over an adjacent dot, and in such a case, the fatting correction in the main scanning direction is to be performed. In the step S9 or S11, the signal SFC is set as "1" or "0", and in the step S27 or S29, the signal MFC is set as "1" or "0", and therefore, in response to these signals, in a step S31, the subline data for fatting correction (or the subline data for not performing the fatting correction) is inputted to the shift register 54 (FIG. 1) from the OR gate 46 (FIG. 2).

Then, in response to the signal S/P signal SP outputted from the timing controller 62, in a step S33, the current line data is loaded to the latch 48 (FIG. 2). Next, in a step S35, the data from the line buffer 16 is read-out. More specifically, in the step S35, in accordance with the initial setting performed by the previous step S1, the 8-bit parallel data is read-out from the line buffer 16. Therefore, in a next step S37, the horizontal direction counter 72 is incremented, and therefore, it can be understood that the video data read at the time is the data for a next dot or pixel.

Then, in a step S39, it is determined whether or not the process for one subline is completed. If "NO" is determined in the step S39, the previous steps S15–S37 are repeatedly executed.

If the process for one subline is completed, the subline start signal SUBLINE START is outputted again from the timing controller 62, and therefore, in a step S41, the subline counter 70 is incremented and the data of the shift register 54 is loaded to the line buffer 56.

Then, in a step S43, it is determined whether or not all the processes for four sublines are completed. Then, if "NO" is determined in the step S4, the previous steps S5–S41 are repeatedly executed. When "YES" is determined, the line start signal LINE START is outputted from the timing controller 62, and in response thereto, the preceding line counter 66 and the current line counter 68 are incremented.

Then, lastly, it is determined whether or not all the processes for all lines are completed, and if "NO" is determined, the previous steps S3–S45 are repeatedly executed, and if "YES" is determined, the process of 1 page is terminated.

Figure 6:
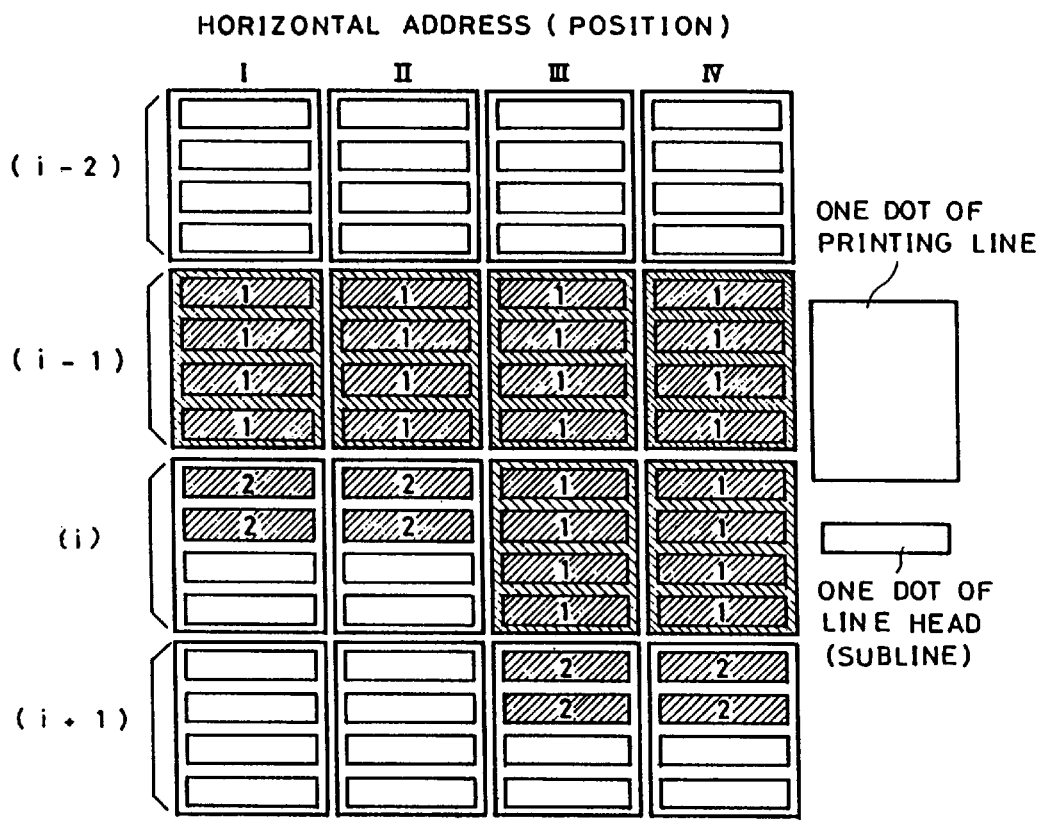
FIG. 6 is an illustrative view showing a driven state of a line head for fattening a dot or pixel in an auxiliary scanning direction in the embodiment.

In this embodiment shown, in a case where the line width is fatted in the auxiliary scanning direction by two sublines, an operation shown in FIG. 6 is executed. In this case, "2" is set in the fatting amount register 42. Therefore, the signal SFC of "1" is outputted from the comparator 40 at a timing of the first subline and a timing of the second subline. Therefore, as described later, the subline date of the first and second sublines of the current line are replaced with the subline data for fatting correction which are obtained on the basis of the data of the preceding line by the AND gate 38 and the OR gate 46.

In addition, in FIG. 6, a dot represented by "1" is a dot which is to be originally made as a black dot, and a dot represented by "2" is a dot changed into a block dot by the fatting correction.

More specifically, in FIG. 6, an (i−2) line, and an (i−1) line, an (i) line and an (i+1) line respectively show print lines, and each of the print lines is formed by the first to the fourth sublines. The (i) line is the current line, and the (i−1) is the preceding line, and the (i+1) line is the succeeding line. The first and second dots of the first and second sublines in the (i) line (current line) are replaced with block dots represented by "2". Furthermore, the third and fourth dots of the first and second sublines in the (i+1) are replaced with black dots represented by "2".

More specifically, when the (i) line is the current line, the (i−1) line is the preceding line, and therefore, the fatting correction of the (i) line is performed by taking the (i−1) line into consideration. Then, the process for the first subline of the (i) line is performed. At this time, the subline number data is applied from the subline counter 70, and the signal SFC from the comparator 40 becomes "1", and therefore, the video data of the preceding line is outputted from the AND gate 38. The output of the AND gate 38 is loaded to the line head 52, i.e. the shift register 54 through the OR gate 46. If the signal SFC from the comparator 40 is "0", the AND gate 38 is turned-off, no data of the preceding line is outputted. Therefore, the subline data from the P/S converter 36 is applied to the shift register 54 through the OR gate 46 for the first subline of the current line. However, in this operative example, since the signal SFC becomes "1" at the first subline, the video data of the preceding line from the AND gate 38 is applied to the shift register 54 as the subline data for the first subline of the current line. That is, the subline data of the first subline in the current line is replaced with the subline data generated on the basis of the video data of the preceding line. Since the data of the fatting amount register 42 is "2", the subline data for the second subline in the current line is also replaced with the subline data generated on the basis of the video data of the preceding line.

That is, since respective dots in the (i−1) line corresponding to respective dots of the first subline and the second subline in the (i) line are black dots, the respective dots are made as black dots at the first and second sublines in the (i) line. On the other hand, even if respective dots in the (i) line corresponding to respective dots in the (i−1) line are black dots, the respective dots in the (i) line are made white dots for the third and fourth sublines because at the third and fourth sublines, the signal SFC from the comparator 40 becomes "0", and the AND gate 38 is turned-off, and therefore, the subline data for the current line from the P/S converter 36 is outputted from the OR gate 46.

Thus, respective subline data for the (i) line can be obtained. Then, the subline data is supplied to the shift register 54, and the respective light points of the fluorescent head 60 are driven in accordance with the subline data. At the first and second sublines constituting the (i) line, all the first to fourth dots become black dots, and at the third and fourth sublines, the third and fourth dots become white dots. Therefore, the thinning of the line width in the auxiliary scanning direction is corrected by making the two sublines black.

Figure 7:
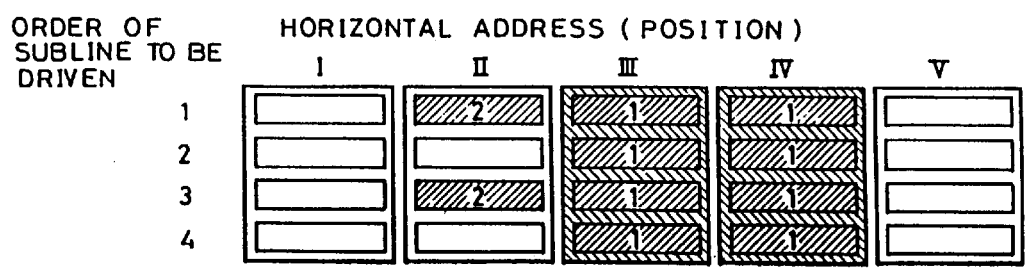
FIG. 7 is an illustrative view showing a driven state of the line head for fattening the dot or pixel in a main scanning direction in the embodiment.

An operation for the fatting correction in the main scanning direction is similar to the above described operation. More specifically, as shown in FIG. 7, since a dot right adjacent to the second dot of the preceding line is to be originally made as a black dot, in processing the second dot, at the first and third sublines, the second dot is made as a black dot, and at the second and fourth sublines, the second dot is made as white dots. Therefore, a dot to be originally made as a white dot is changed to a black dot in the main scanning direction, and the fatting correction in the main scanning direction can be performed.

In a case where the line width is fatted in the main scanning direction by 0.5 dots (a half of one dot), an operation shown in FIG. 7 is executed. In this case, when "127" is set in the enlargement rate register 76, "63" that is corresponding to the fatting rate of "0.5" is set in the fatting amount register 96 according to the above described equation. On the other hand, according to the tables 1 and 2, "enlargement rate×½", "enlargement rate×¾", "enlargement rate×²⁄₄" and "enlargement rate×¼" are set in the latch 86 as the initial values for the first subline, the second subline, the third subline and the fourth subline. Therefore, from the 8-bit adder 94, the carry signals CARRY2 are outputted at a timing of the first subline and a timing of the third subline. Accordingly, the signal MFC becomes "1" at the timing of the first subline and the timing of the third subline. At a timing of the second subline and at a timing of the fourth subline, the signal MFC is "0".

When the signal MFC becomes "1", the AND gate 50 is turned-on, and therefore, the subline data of the current line that is delayed by 1 bit by the latch 48 is outputted from the AND gate 50. Therefore, in this operative example, at the timing of the first subline and the timing of the third subline, the subline data for fatting correction from the latch 48 are outputted from the OR gate 46. On the other hand, at the timing of the second subline and the timing of the fourth subline, the subline data from the P/S converter 36 are outputted from the OR gate 46. Therefore, as shown in FIG. 7, in the first and third sublines, the second dot or pixel is made as the black dot due to an influence of the third dot or pixel which is adjacent to the second dot or pixel.

In addition, in the above described operative examples, the fatting correction in which a dot that is originally to be made as a white dot is changed to a black dot equal to the corresponding dot of the preceding line (or the adjacent dot); however, a correction wherein the line width is thinned can be also performed in the above described embodiment in the same manner. In this case, a dot that is originally to be made as a black dot may be changed to a white dot that is the same as that of the preceding line (or the adjacent dot).

Next, with referring FIG. 8 and FIG. 9, the moire correction will be described. If black dots are 15 continued in the main scanning direction, the moire occurs. Therefore, the moire correction means a correction that the black dots are prevented from being continued in the main scanning direction. In order to perform such the moire correction, in the above described embodiment, by setting the enlargement rate data in the enlargement rate register 76, the sampling positions for respective sublines are changed as shown in FIG. 9.

Figure 9:
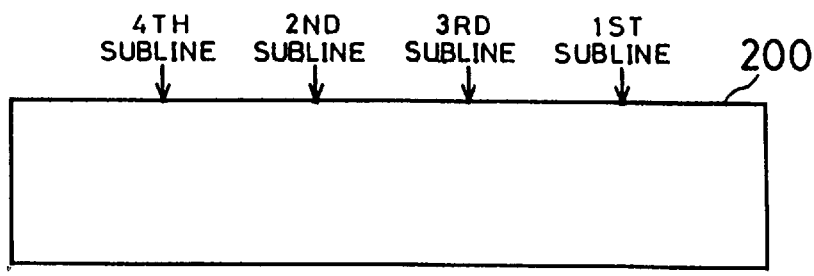
FIG. 9 is an illustrative view showing the sampling positions of the respective sublines in association with a dot before the resolution is converted in the embodiment.

More specifically, a rectangular form 200 shown in FIG. 9 indicates one dot at a time that the resolution is 200 dpi, for example. Then, by setting suitable data in the enlargement rate register 76, as shown in FIG. 9, a timing for sampling the dot 200 of the input video signal is changed for each subline. In an example shown in FIG. 9, in the order of the fourth subline, the second subline, the third subline and the first sublines, the dot 200 of the input video signal is sampled.

Figure 8:
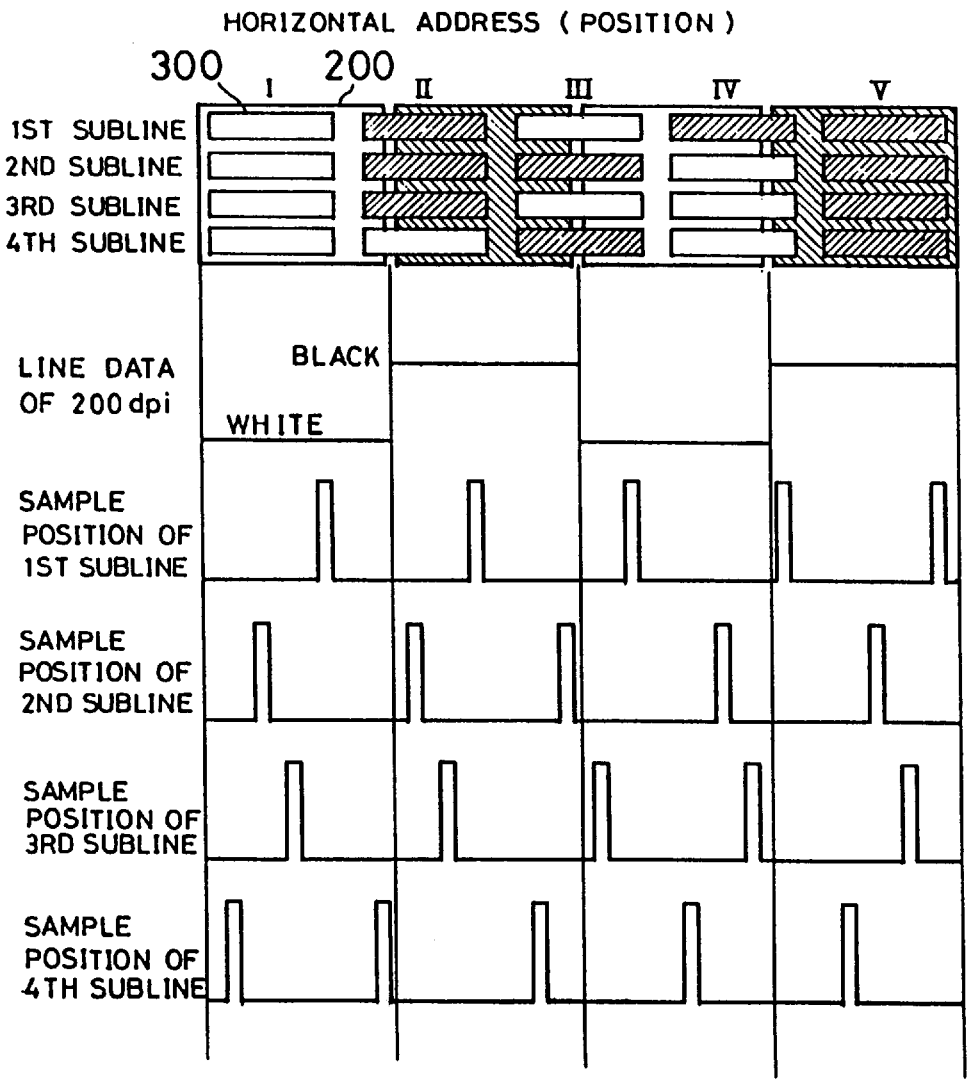
FIG. 8 is an illustrative view showing a driven state of the line head and sampling position of respective sublines in a case where a resolution is converted into the main scanning direction in the embodiment.

In FIG. 8, a rectangular form 300 indicates one dot of the line head 52 having the resolution of 300 dpi, for example. Therefore, FIG. 8 shows a case where the input video signal of 200 dpi is printed by the line head 52 of 300 dpi. In this case, a value within a range of "0"–"256" is set in the enlargement rate register 76 as the enlargement rate data. Then, according to the table 1 and the table 2, the initial value is set in the latch 86 for each subline. Therefore, the carry signal CARRY1 is outputted from the adder 82 at a timing shown in FIG. 8 and FIG. 9, and in response to the carry signal CARRY1, the S/P shift signal SP is outputted from the latch 92. The respective subline data are generated at every timing of the signal SP. Therefore, even if the same input video data is sampled, the respective subline data become different from each other as shown in FIG. 8. The input video data is white, black, white, black, . . . in the order from left, and the first subline is white, black, white, black, black, . . . in the order from left, and the second subline is white, black, black, white, black, . . . in the order from left, and the third subline is white, black, white, white, black, . . . in the order from left, and the fourth subline is white, white, black, white, black, . . . in the order from left. Accordingly, all the video data are represented by 5 dots of the line head 52, and therefore, the moire can be reduced.

In a case where the image forming apparatus 10 is used as a facsimile or a printer, the image forming apparatus 10 operates in accordance with a flow chart shown in FIG. 10 wherein steps S1*a*, S1*b*, S2*a* and S2*b* are illustrated. These steps S1*a*–S2*b* are substituted for the step S1 shown in FIG. 5A.

More specifically, in the step S1*a* in FIG. 10, the timing controller 62 (FIG. 3) is triggered by the computer (not shown), and in response thereto, the page start signal PAGE START, the line start signal LINE START and the subline start signal SUBLINE START are outputted from the timing controller 62. In response to the page start signal PAGE START, "0" is set in the preceding line counter 66, and "1" is set in the current line counter 68, and "2" is set in the write line counter 26. Thereafter, in the step S1*b*, it is determined whether the video data being inputted is for a facsimile or a printer. Such a determination can be performed by detecting a signal outputted by the computer (not shown). Then, if "YES" is determined, in the step 2*a*, from the computer (not shown), the fatting amount data for facsimile for the auxiliary scanning direction is set in the fatting amount register 42 (FIG. 2), and the enlargement rate data for facsimile is set in the enlargement rate register 76 (FIG. 4), and the fatting amount data for facsimile for the main scanning direction is set in the fatting amount register 96 (FIG. 4). If "NO" is determined, in the step 2*b*, from the computer (not shown), the fatting amount data for printer for the auxiliary scanning direction is set in the fatting amount register 42 (FIG. 2), and the enlargement rate data for printer is set in the enlargement rate register 76 (FIG. 4), and the fatting amount data for printer for the main scanning direction is set in the fatting amount register 96 (FIG. 4). Then, the process proceeds to the step S3 shown in FIG. 5A.

That is, in this embodiment shown, if the image forming apparatus 10 is used as a facsimile, data of the fatting amounts and enlargement rate by which a thin line does not disappear and no moire occurs are set in the registers 42, 76 and 96. On the other hand, if the apparatus 10 is used as a printer, the data of the fatting amounts and the enlargement rate by which no thinning or fatting occurs are set in the registers 42, 76 and 96.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. An image forming apparatus comprising:

storing means for storing input video data;

a line head having a plurality of individually driveable light points for producing a plurality of sublines arranged in parallel to form one line of a print image according to said input video data by selectively driving the light points to produce said sublines;

first subline data generating means for generating a plurality of first subline data for a plurality of sublines constituting a print line on the basis of the input video data;

said first subline data generating means including a first P/S converter which generates said first subline data on the basis of video data of a current line, supplying means for sequentially supplying said first subline data to said line head;

designating means for outputting a correction signal when a correction of print line width is required;

second subline data generating means for generating second subline data;

replacing means for replacing the first subline data with second subline data for print line width correction in response to said correction signal, image forming means which scans the light points of said line head in a first direction and provides relative movement between said line head and a recording medium in a second direction intersecting said first direction to be scanned in said second direction as said sublines are produced, wherein said second subline data generating means includes means for generating the second subline data for print line width correction in said first direction, said designating means designates the print line width correction in at least one of said first direction and said second direction by said correction signal, and said second subline data generating means generates the second subline data for the print line width correction in at least one of said first direction and said second direction, whereby said replacing means replaces said first subline data with said second subline data for print line width correction in at least one of said first direction and said second direction in response to said correction signal, said designating means includes means for outputting a first correction signal for designating the print line width correction in said first direction, said first subline data generating means further includes a second P/S converter which generates the subline data on the basis of video data of a preceding line prior to said current line, and first gate means for outputting the subline data from said second P/S converter as said second subline data in response to said first correction signal, and said replacing means includes means for replacing said first subline data with said second subline data from said first means in response to said first correction signal.

2. An image forming apparatus comprising:

storing means for storing input video data;

a line head having a plurality of individually driveable light points for producing sublines arranged in parallel for one line of a print image according to said input video data by selectively driving the light points to produce said sublines;

first subline data generating means for generating a plurality of first subline data for a plurality of sublines constituting a print line on the basis of the input video data;

supplying means for sequentially supplying said first subline data to said line head;

designating means for outputting a correction signal when a correction of print line width is required;

second subline data generating means for generating said second subline data;

replacing means for replacing the first subline data with second subline data for print line width correction in response to said correction signal, image forming means which scans the light points of said line head in a first direction and provides relative movement between said line head and a recording medium in a second direction intersecting said first direction to be scanned in said second direction as said sublines are produced, and wherein second subline data generating means includes means for generating the second subline data for print line width correction in said first direction, said designating means designates the print line width correction in at least one of said first direction and said second direction by said correction signal, and said second subline data generating means generates the second subline data for the print line width correction in at least one of said first direction and said second direction, whereby said replacing means replaces said first subline data with said second subline data for print line width correction in at least one of said first direction and said second direction in response to said correction signal, said designating means includes means for outputting a first correction signal for designating the print line width correction in said first direction, said replacing means includes means for replacing said first subline data with said second subline data in response to said first correction signal, and subline number outputting means for outputting the subline number of each of said plurality of sublines, wherein said first designating means includes means for setting first correction data indicative of a print line width correction amount in said first direction, and comparing means for comparing said first correction data and said subline number with each other, and for outputting said first correction signal in response to a comparison result.

3. An image forming apparatus comprising:

storing means for storing input video data;

a line head having a plurality of individually driveable light points for producing sublines arranged in parallel forming one line of a print image according to said input video data by selectively driving the light points to produce said sublines;

first subline data generating means for generating a plurality of first subline data for a plurality of sublines constituting a print line on the basis of the input video data;

second subline data generating means for generating said second subline data;

supplying means for sequentially supplying said first subline data to said line head;

designating means for outputting a correction signal when a correction of print line width is required;

replacing means for replacing the first subline data with second subline data for print line width correction in response to said correction signal, wherein said print line width correction is performed by a subline or sublines not adjacent to each other;

image forming means which scans the light points of said line head in a first direction and provides relative movement between said line head and a recording medium in a second direction intersecting said first direction to be scanned in said second direction as said sublines are produced, and wherein second subline data generating means includes means for generating second subline data for print line width correction in said second direction, said designating means designates the print line width correction in at least one of said first direction and said second direction by said correction signal, and said second subline data generating means generates the second subline data for the print line width correction in at least one of said first direction and said second direction, whereby said replacing means replaces said first subline data with said second subline data for print line width correction in at least one of said first direction and said second direction in response to said correction signal, wherein said second subline data generating means includes means for generating the second subline data for print line width correction in said first direction, said designating means includes means for outputting a first correction signal for designating the print line width correction in said first direction, said designating means includes means for outputting a first correction signal for designating the print line width correction in said first direction, and said replacing means includes means for replacing said first subline data with said second subline data from said first means in response to said first correction signal, said designating means includes means for outputting a second correction signal for designating the print line width correction in said second direction, and said replacing means includes means for replacing said first subline data with said second subline data from said means for generating second subline data in response to said second correction signal, wherein said means for generating second subline data for print line width correction in said second direction generates said data for print line width correction in said second direction in accordance with video data of an adjacent light point in said second direction.

4. An image forming apparatus according to claim 3, wherein said first subline data generating means includes a first P/S converter which generates said first subline data on the basis of video data of a current line, and said means for generating second subline data for print line width correction in said second direction includes delay means for delaying the first subline data from said first P/S converter by a predetermined bit, and gate means for outputting an output of said delay means as said second subline data in response to said second correction signal.

5. An image forming apparatus comprising:

storing means for storing input video data;

a line head having a plurality of individually driveable light points for producing a plurality of sublines arranged in parallel to form one line of a print image according to said input video data by selectively driving the light points to produce said sublines;

first subline data generating means for generating a plurality of first subline data for a plurality of sublines constituting a print line on the basis of the input video data;

second subline data generating means for generating second subline data;

supplying means for sequentially supplying said first subline data to said line head;

designating means for outputting a correction signal when a correction of print line width is required;

replacing means for replacing the first subline data with second subline data for print line width correction in response to said correction signal, wherein said print line width correction is performed by the subline or sublines not adjacent to each other;

image forming means which scans the light points of said line head in a first direction and provides relative movement between said line head and a recording medium in a second direction intersecting said first direction to be scanned in said second direction as said sublines are produced, and wherein said second subline data generating means includes means for generating the second subline data for print line width correction in said first direction and said second subline data generating means includes means for generating second subline data for print line width correction in said second direction, said designating means designates the print line width correction in at least one of said first direction and said second direction by said correction signal, and said second subline data generating means generates the second subline data for the print line width correction in at least one of said first direction and said second direction, whereby said replacing means replaces said first subline data with said second subline data for print line width correction in at least one of said first direction and said second direction in response to said correction signal, said designating means includes means for outputting a first correction signal for designating the print line width correction in said first direction, said replacing means includes means for replacing said first subline data with said second subline data from said first means in response to said first correction signal, said designating means includes second designating means for outputting a second correction signal for designating the print line width correction in said second direction, and said replacing means includes means for replacing said first subline data with said second subline data from said second means in response to said second correction signal, wherein said second designating means includes second correction data setting means for setting second correction data indicative of a print line width correction amount in said second direction, and first adding means for adding said second correction data and a predetermined value to each other.

6. An image forming apparatus, comprising:

storing means for storing input video data;

a line head having a plurality of light points aligned over the length of one line of a print image to be produced, said line head forming a print line of the image according to said input video data by selectively driving the light points to produce a plurality of sublines;

subline data generating means for generating a plurality of subline data for a plurality of sublines constituting a print line by sampling said input video data, said subline data generating means including a P/S converter which generates said subline data by sampling video data of the line to be printed;

supplying means for sequentially supplying said subline data to said line head;

subline number outputting means for outputting numbers of said plurality of sublines which are generated by said subline date generating means; and sampling position changing means for changing a sampling position at which said input video data is sampled by said subline data generating means wherein said sampling position changing means includes signal outputting means for outputting a sampling signal at timings different from each other in accordance with said subline number outputted by said subline number outputting means, and said signal outputting means applies said sampling signal as a shift signal of said P/S converter.

7. An image forming apparatus according to claim 6, wherein said signal outputting means includes means for performing adding operations in a respectively different manner according to a said subline number, and a carry signal from said means for performing adding operations is applied to said P/S converter as said shift signal.

8. An image forming apparatus comprising:

storing means for storing input video data;

a line head having a plurality of individually driveable light points for producing a plurality of sublines arranged in parallel for forming a print line of an image according to said input video data by selectively driving the light points to produce said sublines;

first subline data generating means for generating a plurality of first subline data for a plurality of sublines constituting a print line on the basis of the input video data;

supplying means for sequentially supplying said first subline data to said line head;

designating means for outputting a correction signal when a correction of print line width is required;

correction data setting means for selectively setting correction data for facsimile or correction data for printing;

second subline data generating means for generating second subline data according to the correction data for facsimile or the correction data for printing;

replacing means for replacing the first subline data with said second subline data for print line width correction in response to said correction signal;

image forming means which scans the light points of said line head in a first direction and provides relative movement between said line head and a recording medium in a second direction intersecting said first direction to be scanned in said second direction as said sublines are produced; wherein said designating means designates the print line width correction in at least one of said first direction and said second direction by said correction signal, said correction data setting means sets said correction data for facsimile or said correction data for printing for at least one of said first direction and said second direction, and said second subline data generating means generates the second subline data for the print line width correction in at least one of said first direction and said second direction according to said correction data, whereby said replacing means replaces said first subline data with said second subline data for print line width correction in at least one of said first direction and said second direction in response to said correction signal, wherein said second subline data generating means includes means for generating the second subline data for print line width correction in said first direction, said designating means includes means for outputting a first correction signal for designating the print line width correction in said first direction, said correction data setting means includes means for selectively setting first correction data for facsimile or first correction data for printing, and said replacing means includes means for replacing said first subline data with said second subline data from said first means in response to said first correction signal, wherein said first subline data generating means includes a first P/S converter which generates said first subline data on the basis of video data of a current line, and said first subline data generating means includes a second P/S converter which generates said first subline data on the basis of video data of a preceding line prior to said current line, and first gate means for outputting the subline data from said second P/S converter as said second subline data in response to said first correction signal.

9. An image forming apparatus comprising:

storing means for storing input video data;

a line head having a plurality of individually driveable light points for producing a plurality of sublines arranged in parallel for forming an image print line according to said input video data by selectively driving the light points to produce said sublines;

first subline data generating means for generating a plurality of first subline data for a plurality of sublines constituting a print line on the basis of the input video data;

supplying means for sequentially supplying said first subline data to said line head;

designating means for outputting a correction signal when a correction of print line width is required;

correction data setting means for selectively setting correction data for facsimile or correction data for printing;

second subline data generating means for generating second subline data according to the correction data for facsimile or the correction data for printing;

replacing means for replacing the first subline data with said second subline data for print line width correction in response to said correction signal, image forming means which scans the light points of said line head in a first direction and provides relative movement between said line head and a recording medium in a second direction intersecting said first direction to be scanned in said second direction as said sublines are produced; wherein said designating means designates the print line width correction in at least one of said first direction and said second direction by said correction signal, said correction data setting means sets said correction data for facsimile or said correction data for printing for at least one of said first direction and said second direction, and said second subline data generating means generates the second subline data for the print line width correction in at least one of said first direction and said second direction according to said correction data, whereby said replacing means replaces said first subline data with said second subline data for print line width correction in at least one of said first direction and said second direction in response to said correction signal, wherein said second subline data generating means includes means for generating the second subline data for print line width correction in said first direction, said designating means includes means for outputting a first correction signal for designating the print line width correction in said first direction, said correction data setting means includes means for selectively setting first correction data for facsimile or first correction data for printing, and said replacing means includes means for replacing said first subline data with said second subline data from said first means in response to said first correction signal;

further comprising subline number outputting means for outputting the subline number of each of said plurality of sublines, wherein said first designating means includes means for setting first correction data indicative of a print line width correction amount in said first direction, and comparing means for comparing said first correction data and said subline number with each other, and for outputting said first correction signal in response to a comparison result.

10. An image forming apparatus according to claim 9, wherein said second subline data generating means includes means for generating second subline data for print line width correction in said second direction, said designating means includes second designating means for outputting a second correction signal for designating the print line width correction in said second direction, said correction data setting means includes a second correction data setting means for selectively setting second correction data for facsimile or second correction data for printing, and said replacing means includes second replacing means for replacing said first subline data with said second subline data from said means for generating second subline data for print line width correction in said second direction in response to said second correction signal.

11. An image forming apparatus according to claim 10, wherein said means generating said second subline data for print line width correction in said second direction generates said data in accordance with video data for driving an adjacent light point in said second direction.

12. An image forming apparatus according to claim 11, wherein said first subline data generating means includes a first P/S converter which generates said first subline data on the basis of video data of a current line, and said means for generating second subline data for print line width correction in said second direction includes delay means for delaying the first subline data from said first P/S converter by a predetermined bit, and gate means for outputting an output of said delay means as said second subline data in response to said second correction signal.

13. An image forming apparatus according to claim 12, wherein said second designating means includes second correction data setting means for setting second correction data indicative of a print line width correction amount in said second direction, and means for adding said second correction data and a predetermined value to each other.

14. An image forming apparatus comprising:

storing means for storing input video data;

a line head having a plurality of individually driveable light points for producing a plurality of sublines arranged in parallel for forming one line of a print image according to said input video data by selectively driving the light points for producing said sublines;

subline data generating means for generating a plurality of subline data for a plurality of sublines constituting a print line by sampling said input video data;

supplying means for sequentially supplying said subline data to said line head;

enlargement rate data setting means for selectively setting enlargement rate data for facsimile or enlargement rate data for printing;

sampling position changing means for changing a sampling position at which said input video data is sampled by said subline data generating means for each subline in accordance with said enlargement rate data for facsimile or said enlargement rate data for printing; and subline number outputting means for outputting the subline number of each of said plurality of sublines, wherein said sampling position changing means includes signal outputting means for outputting sampling signals at timings different from each other in accordance with said subline number.

15. An image forming apparatus according to claim 14, wherein said subline data generating means includes a P/S converter which generates said subline data by sampling video data of a current line, and said signal outputting means applies said sampling signal as a shift signal of said P/S converter.

16. An image forming apparatus according to claim 15, wherein said signal outputting means includes means for performing adding operations in manners different from each other according to said subline number, and a carry signal from said adding means is applied to said P/S converter as said shift signal.

* * * * *